(12) United States Patent
Blake et al.

(10) Patent No.: US 7,951,217 B2
(45) Date of Patent: May 31, 2011

(54) LOW PRESSURE IMPACT SEPARATOR FOR SEPARATION, CLASSIFICATION AND COLLECTION OF ULTRA-FINE PARTICLES

(75) Inventors: Thomas R. Blake, Amherst, MA (US); Karl Jakus, Amherst, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 11/482,182

(22) Filed: Jul. 6, 2006

(65) Prior Publication Data
US 2007/0277486 A1 Dec. 6, 2007

Related U.S. Application Data

(62) Division of application No. 10/442,639, filed on May 21, 2003, now Pat. No. 7,077,887.

(60) Provisional application No. 60/382,395, filed on May 21, 2002.

(51) Int. Cl.
*B01D 50/00* (2006.01)

(52) U.S. Cl. ............... 55/343; 55/344; 55/467; 209/132

(58) Field of Classification Search ............ 95/267; 55/343, 344, 443, 462, 465, 466, 467, 320, 55/328; 209/132
See application file for complete search history.

(56) References Cited

U.S. PATENT DOCUMENTS

| | | | | |
|---|---|---|---|---|
| 5,221,305 | A | * | 6/1993 | Bakharev |
| 5,343,830 | A | * | 9/1994 | Alexander et al. |
| 5,407,079 | A | * | 4/1995 | Rancourt |
| 5,584,901 | A | * | 12/1996 | Bakharev et al. |
| 6,174,339 | B1 | * | 1/2001 | Varady |
| 6,241,969 | B1 | * | 6/2001 | Saidi et al. |
| 6,283,301 | B1 | * | 9/2001 | Pedersen |
| 6,365,856 | B1 | * | 4/2002 | Whitelaw |
| 7,077,887 | B2 | * | 7/2006 | Blake et al. |

FOREIGN PATENT DOCUMENTS

| | | | |
|---|---|---|---|
| DE | 100 50 651 | * | 4/2002 |
| EP | 0 727 235 | * | 8/1996 |
| JP | 8-266830 | * | 10/1996 |
| JP | 08266830 A | * | 10/1996 |

OTHER PUBLICATIONS

Leschonski, K., "Classification of particles in the submicron range in an impeller wheel air classifier," KONA Powder and Particle, No. 14 (1996).
Forbes, R.T., "Production of stable protein particles: A comparison of freeze, spray and supercritical drying," Presented at the World Congress on particle technology 3 in Brighton, UK, Jul. 7-9, 1998.
Blake, T.R. et al., "Two-dimensional irrotational imcompressible flow with particles past a lamina array: Application to louvered impact separators," submitted to the World Congress on particle technology 4, Jul. 21-25, 2002, Sydney.

* cited by examiner

*Primary Examiner* — Robert A Hopkins
(74) *Attorney, Agent, or Firm* — Weingarten, Schurgin, Gagnebin & Lebovici LLP

(57) ABSTRACT

Impact type gas-particle separation is applied to ultra-fine particles by judiciously altering the aerodynamic drag on the particles with respect to their inertia by operation at sub-atmospheric pressures. An impact separator has a housing having a channel in which particles flow in a fluid such as air, a purified gas or mixtures thereof. A plurality of blades are placed in the channel for affecting the motion of the particles and the fluid with respect to each other. A second channel branches from the first channel to receive particles diverted and separated from the flow of the fluid in the first channel. A flow mechanism creates a sub-atmospheric pressure in the channel.

51 Claims, 9 Drawing Sheets

LOW PRESSURE IMPACT SEPARATOR FOR SEPARATION, CLASSIFICATION AND COLLECTION OF ULTRA-FINE PARTICLES

CROSS REFERENCE TO RELATED APPLICATIONS

The present application is a divisional application of U.S. patent application Ser. No. 10/442,639, filed May 21, 2003, now U.S. Pat. No. 7,077,887 which claimed the benefit of U.S. Provisional application No. 60/382,395, filed May 21, 2002, the entire contents of the above applications being incorporated herein by reference.

BACKGROUND OF THE INVENTION

Materials and devices built with smaller and smaller building blocks exhibit unforeseen properties for optical, thermal, electrical, and medical applications. In a large majority of these applications such as high technology devices and biomedical applications, the enhanced functionality is a result of using ultra-fine (less than 1 μm) and, increasingly, nano-scale (less than 100 nm) powders as starting materials or as the enabling component. In the production of these powders in a gas environment, it is important to collect the particles in an efficient manner. It is also necessary to "classify" or separate the desired particle size from other sizes that may be a byproduct of the process to assure only small variances. This means that strategies are needed for removal of agglomerates, classification, and collection.

Current commercial applications where ultra-fine-particles have a significant impact include pigments, toners, sunscreens, solid lubricants, magnetic recording media, electronics devices, ceramic fabrication, and pharmaceuticals. It is expected that the use of ultra-fine powders in nano-technology will substantially grow in the near future.

The technology of "impact type gas particle separators" provides robust performance for collection of powders in the 10 μm diameter range. Impact separators incorporate arrays of aerodynamic surfaces, which intercept the particle-laden gas flow. These surfaces alter the direction of the gas flow with such high acceleration that the particle inertia prevents it from following the gas. Thus the particle pathways and the gas streamlines diverge and the particles are separated. However, ultra-fine and nano-scale particles have a high ratio of aerodynamic drag to inertia, and do not readily separate from the gas flow. Therefore, powders with diameters less than 1 μm cannot be readily collected or classified with impact separators.

BRIEF SUMMARY OF THE INVENTION

While small scale particles have been found to be beneficial, it is recognized that it is necessary to have manufacturing technologies for processing large amounts of material. Specifically, removal of agglomerates (sizing), effective collection, and post-synthesis handling of ultra-fine powders must be developed for industrial processes. It is recognized that there are formidable challenges in handling ultra-fine and nano-scale powders on a commercial scale. Collection and handling techniques that were found to be adequate in the laboratory will not suffice in industry.

This invention relates to an impact type gas-particle separation of ultra-fine particles by judiciously altering the aerodynamic drag on the particles with respect to their inertia by operation at sub-atmospheric pressures.

The invention relates to an impact separator having a housing having a channel in which particles flow in a fluid such as air, a purified gas, or mixtures thereof. A plurality of blades are placed in the channel for affecting the motion of the particles and the fluid with respect to each other. A second channel branches from the first channel to receive particles diverted and separated from the flow of the fluid from the first channel. Those particles that are diverted to the second channel are "collected." Those particles that are not diverted to the second channel and that follow the fluid in the first channel are "classified." A flow mechanism creates a sub-atmospheric pressure in the channel.

In a preferred embodiment, a plenum chamber with a sonic nozzle is connected to the channel for assuring uniform particle loading. The flow mechanism is a vacuum pump.

The invention relates to a method of separating particles. An impact separator has a chamber with a plurality of vanes and a flow mechanism. The separator is operated at subatmospheric pressure to separate particles by a characteristic such as by size and/or by density.

In one embodiment, the separator operates at sub-atmospheric pressure in a range less than or equal to $10^{-3}$ atmospheres therein providing a high fractional efficiency for the separation and collection of ultra-fine particles. In one mode, the desired particles, that is those with a size larger than a predetermined diameter, are diverted to the second channel and collected.

In another embodiment, the separator operates at sub-atmospheric pressure in a range of less than or equal to $10^{-5}$ atmospheres therein providing a high fractional efficiency for the separation and collection of nano-size particles. In one mode, the desired particles, those with a size smaller than a predetermined diameter follow the fluid in the first channel and are separated or "classified" from the undesired particles that are diverted to the second channel.

An object of the present invention is to provide an improved impact separator, to which operates at sub-atmospheric pressures and provides a high fractional efficiency for the separation and collection or classification of ultra-fine particles dependent on the subatmospheric pressure and separator geometry.

Another object of the invention is to provide an improved impact separator, which operates at subatmospheric pressure and provides a high fractional efficiency for the separation and classification of nano-size particles.

A further object of the invention is to provide a semi-empirical model of the gas and particle dynamics providing an improved impact separator, which operates at sub-atmospheric pressure, wherein the geometry, location, and angle of attack of the deflecting surfaces are selected through the model.

According to the invention an apparatus is provided, operating at sub-atmospheric pressure, for collection of ultra-fine particles, larger than a predetermined diameter, or classification of ultra-fine particles, smaller than a predetermined diameter, from a gas in which the particles are dispersed. The gas and particles flow along the longitudinal axis of a conduit. A plurality of blades of aerodynamic cross-section are placed in the channel for affecting the motion of the particles and the fluid with respect to each other. A second channel branches from the first channel to receive particles diverted and separated from the flow of the fluid in the first channel.

The trajectory of a particle is determined by the competition between the drag and inertial forces. Existing particle separators have not utilized the relationship between inertia and drag coupled with flow velocity and gas pressure to control separation of small particles. The size and shape of these particles can vary between spherical, flakes or agglomerations thereof and consequentially substantially alter the separation conditions needed for efficient operation. When particle inertia is large relative to the drag, the particles do not follow the gas flowing around the array of blades in the channel. Those particles are diverted by the blades to the second channel and are collected. When particle inertia is small relative to the drag, the particles follow the gas in the first channel; those particles are classified or separated from the larger particles that are diverted to the second channel.

According to the invention, in order to either collect or classify particles with small inertia it is desirable to make the drag force even smaller, which can be accomplished by lowering the gas pressure. Specifically, ultra-fine particles can be collected or can be classified from agglomerates with high efficiency using impact separation at sub-atmospheric pressures.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Impact separators are one of many technologies for separating or classifying solid particles from gases in industrial processes. For larger particles there are settling chambers, where the particles settle through gravity, and cyclone or impact separators, where inertial phenomena are used to separate the particles from the air. Small particles are often captured with fabric filter dust collectors, where the particles adhere to the fabric as the gas passes through it, or with electrostatic precipitators, where particles are charged by an electric field and collected on an anode.

The choice of technology depends on the particle size distribution, flow rates, and desired efficiencies. Thus, for continuous operations, electrostatic precipitators are often selected for separation of small particles (less than 5 μm) at low velocities (2 m/s). However, it is recognized that electrostatic precipitators have limits, such as they are not desirable for use with particles that are adversely affected by a charge and they have low throughput of particles because of the low velocity. Conversely, cyclone separators are generally used to separate larger particles (5-200 μm) at higher velocities (10 m/s).

It is recognized that impact separators provide comparable performance to cyclone separators, but offer opportunity for optimization. By combining the high volumetric flow rates and ease of scale-up of impact separation with sub-atmospheric operation according to the invention, a practical solution is obtained for collection or classification of ultra-fine and nano-scale particles. The term "collection" is generally used in the separation field for those particles that are accumulated and is applied here to those that are diverted. In the embodiment shown in FIG. 1, those particles of a certain size and larger are diverted by the blades. The term "classification" is generally used in the separation field for systematic separation of particles according to size, or some other characteristic, and is applied here to those particles that are not diverted and follow the fluid.

Figure 1:
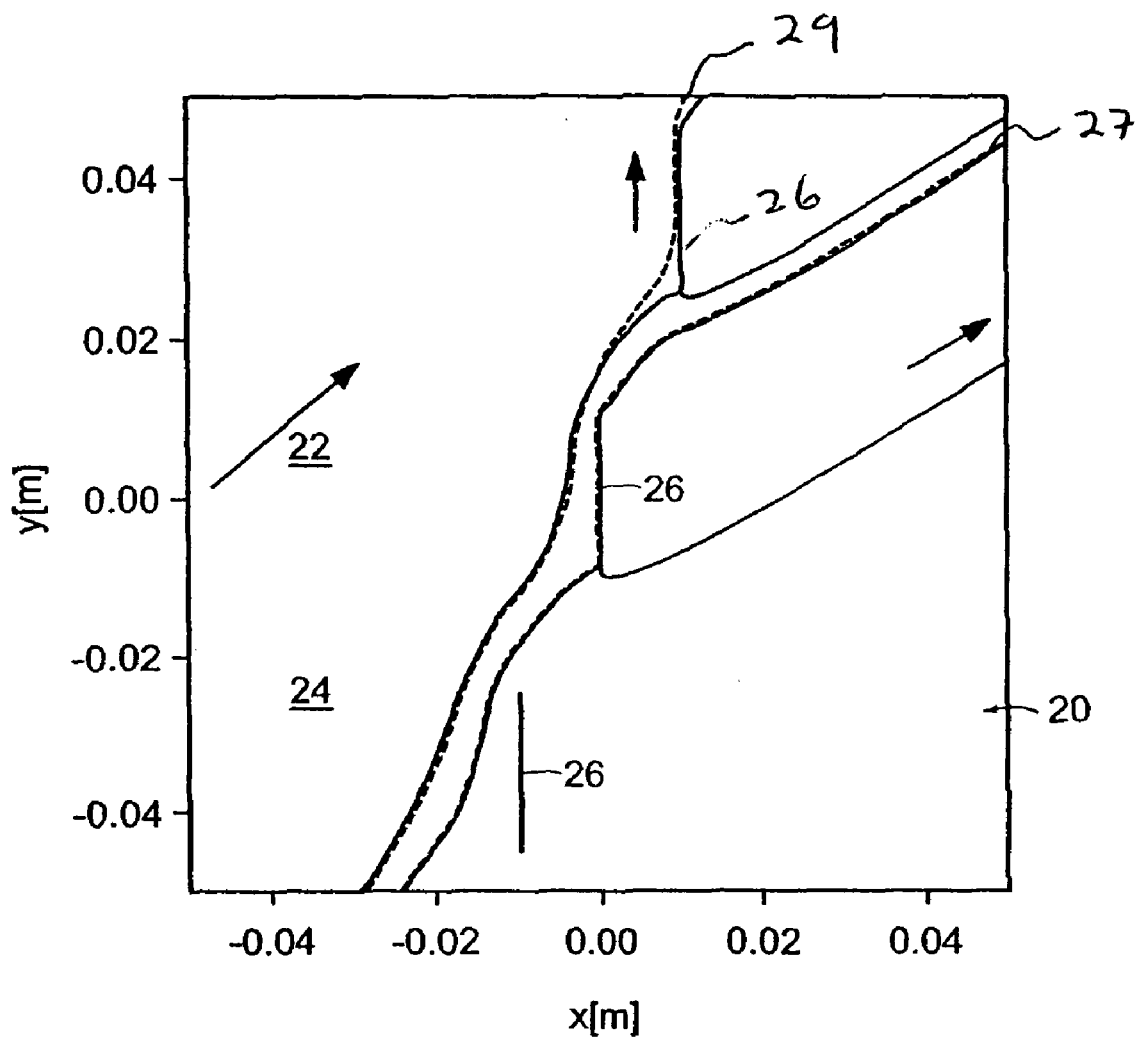
FIG. 1 is a schematic of an impact separator for planar gas and particle flow.

Impact separators incorporate arrays of plates, louvers, or aerodynamic surfaces, which intercept the particle-laden gas as seen in FIG. 1. In the separator 20, the fluid, such as air 22, flows through a channel 24. The separator 20 has a plurality of plates 26 that deflect the larger particles. The basic concept is to alter the direction of the gas flow with such high acceleration that the particle inertia prevents them from following the gas. Thus the particles with high inertia or low drag are separated from the gas. By judiciously placing an array of deflecting surfaces with respect to each other, the deflected gas stream is made to exit the device at a different locale than the particles. Conversely, particles with low inertia or high drag, do not separate from the streamlines and are swept away with the gas.

The incoming air flows past the array of flat plates and carries the smaller particles with it. However, the larger particle trajectories do not follow the streamlines and are deflected parallel to surface of the array. This schematic is applicable to either the collection of the larger particles or to the classification of the smaller particles.

The streamlines and particle trajectories in FIG. 1 are based on actual calculation with a theory for incompressible gas flow and Lagrangian particle dynamics through a two-dimensional flat plate array. The gas and particles approach the array with a velocity of 20 m/s and an angle of π/4 with respect to the surface of the plates. A trajectory 27 for a 1 μm diameter particle follows the gas streamline while trajectory 29 of a 7 μm particle is deflected by the plates.

The ratio of the weight of particles separated to the weight of incoming particles, expressed as a function of the particle size diameter is called the "fractional efficiency" which is an important parameter. Fractional efficiency is a key performance parameter and is strongly influenced by the interactions between the particles, the gas, and the solid surfaces. There are a variety of geometric designs for practical impact separators. The impact separators broadly fall into two categories: two-dimensional flat plate louver designs and cylindrically symmetrical conical ring designs.

Figure 2:
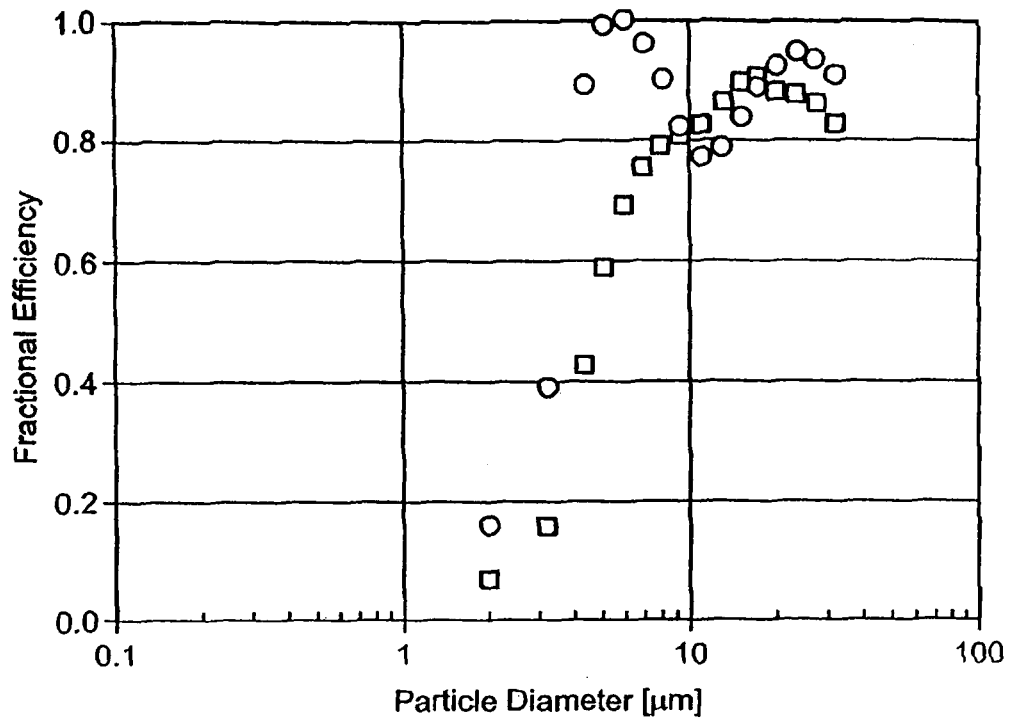
FIG. 2 is a graph of fractional collection efficiency as a function of particle diameter for a conical ring type separator that is operated at atmospheric pressure with different gap dimensions between the rings.

Many of the geometric and aerodynamic parameters affecting impact separation at atmospheric pressure using a conical ring separator such as shown in U.S. Pat. No. 5,221,305 were examined and are further described in "Effect of geometry changes in the performance of an impingement type separator," by M. Frain and the inventors in Proc. $4^{th}$, Int'l Particle Technology Forum, Los Angeles, 2000, which is incorporated herein by reference in its entirety. Typical fractional efficiency data are shown in FIG. 2 for small glass spheres (Potters Industries, PA, Type A-5000) at two different ring gap sizes. Ring gap size is defined as the spacing between the concentric rings that form the separator cone. The "o" are for gap dimension between the rings of 0.394 inches.

The "☐" are for gap dimension between the rings of 1 inch. There is a sudden decrease in collection efficiency in a narrow particle size range for both ring gap sizes. Namely the fractional efficiency falls from 80% at 10 μm to almost zero at 2 μm. Such behavior can be exploited to separate relatively large particles or agglomerates from ultra-fine powders and is termed "classification of the powder." The fractional efficiency data is also relatively independent of the ring gap spacing.

Figure 3:
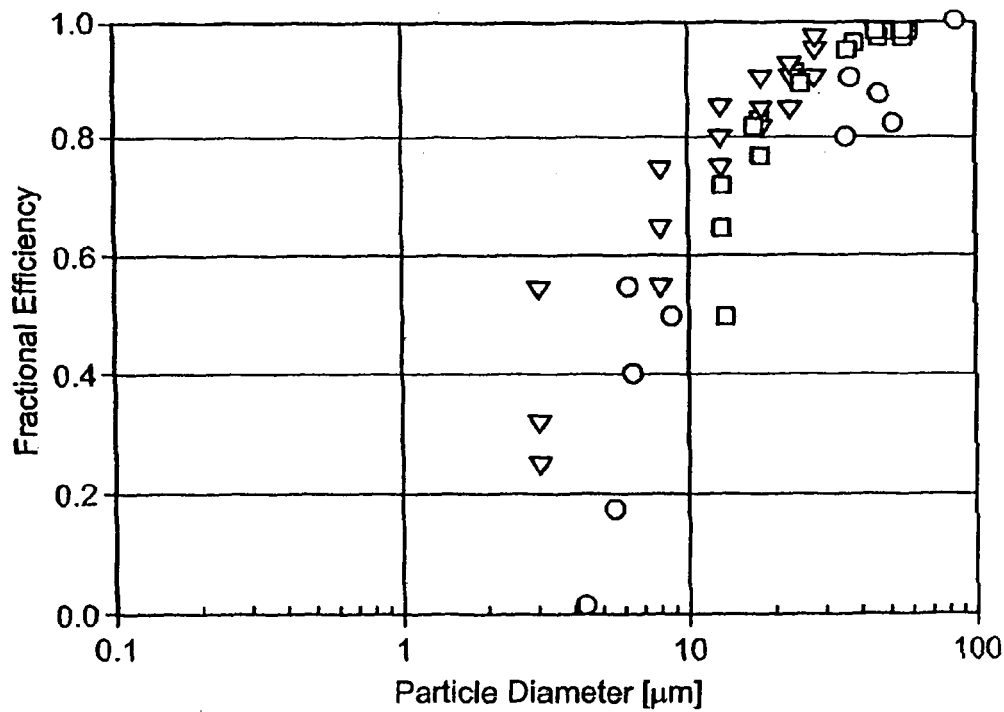
FIG. 3 is a graph of fractional collection efficiency as a function of particle diameter for several impact separators of either cylindrical, rectilinear, or planar geometry at atmospheric pressure.

Previous investigators measured fractional efficiencies at atmospheric pressure, for a variety of separators as illustrated in FIG. 3. While FIG. 2 shows results from a cylindrically symmetrical conical ring design, FIG. 3 shows results from cylindrical, rectilinear or planar plate designs. There is good qualitative and quantitative agreement, independent of the type of separator or the type of particles used for the experiments. The data in FIG. 3 is also similar to that in FIG. 2 for the conical ring device. Even the particle diameter, where 50% of the particles are captured is approximately the same and is approximately 6 μm. The agreement among the many experiments is remarkable, since the efficiencies shown by the "o" measure impact and capture of particles on the blade surfaces of an impact separator, while the efficiencies shown by the "∇" and the "☐" measure the collection of powder at the exit of the impact separators. The results shown are from works of K. Ushiki et al., Kagahu Kogahu Ronbunshu 5(4), p. 424 in 1979; A. V. Alekseev et al., Teploenergetika-Soviet Power Industry Research and Technology Journal, 7, page 36 in 1972; and R. Jackson, "Mechanical Equipment for Removing Grit and Dust from Gases" British Coal Utilisation Association, Leatherhead, England (1963).

The dynamics of the particles and gas adjacent to the deflecting surfaces dominate the separation of particles from the gas. For example, as in FIG. 1, the gas streamlines undergo the greatest rate of change in the stagnation region of a deflecting solid surface and can lead to particle separation. The far field flow pattern is relatively inconsequential for the ability of the device to separate particles from the gas, although the nature of the far field flow is critical for producing a highly curved stagnation streamline. These interpretations of FIGS. 2 and 3 are supported by and described in "Two-dimensional irrotational gas flow with particles past a lamina array; application to louvered impact separators," by the inventors in World Congress Particle Technology 4, Sydney, in 2002, which is incorporated herein by reference in its entirety, and by computational fluid dynamics modeling of the flow within the separator device.

The above figures show that impact separation is an effective method to capture and classify powders. However, it is also clear that current designs and operating environments do not permit significant classification or separation of particles with a diameter less than 5 microns. This invention relates to modifying the operating pressure of impact separators so that particles having a diameter of less than 5 microns, and more particularly ultra-fine particles can be captured and nanoparticles can be separated from agglomerates with high efficiency.

The invention relates to an impact separator that provides comparable performance to cyclone separators, but offers additional opportunities for optimization. The impact separator according to the invention combines the high volumetric flow rates and ease of scale-up with sub-atmospheric operation resulting in a practical solution for separation or classification of ultra-fine particles.

Particle dynamics and the collection or classification of a particle in an impact separator are determined by the competition between the drag and inertial forces. When particle inertia is large or when the drag is small, the particle tends to follow its original trajectory irrespective of the direction of the gas flow. For an impact separator, where the solid surfaces deflect the gas flow, high inertia or low drag allows the particle to separate from the gas. But for small particles, the inertia is small and separation is only possible if the drag is made even smaller. This can be accomplished by lowering the gas pressure in order to reduce the drag on the particle. The drag on a particle significantly decreases in the slip-flow regime where the molecular mean-free path in the gas is comparable to or larger than the particle diameter.

Accordingly, the ultra-fine particles can be collected or classified and can be separated from agglomerates with high efficiency using inertial separation at sub-atmospheric pressures.

A contemporary interpretation of Millikan's equation first published in Physical Rev., 22, p. 1 in 1923 shows how lower pressure or longer molecular mean-free path decreases the drag coefficient for a small sphere:

$$C_D = \frac{24}{R_c}\left[\frac{1}{1 + 2\frac{\lambda(T,P)}{D_p}\left[1.22 + 0.41 \exp\left(-1.74\frac{D_p}{\lambda(T,P)}\right)\right]}\right] \quad (1)$$

where $R_c$, $D_p$, T, P and $\lambda(T,P)$ are, respectively, the particle Reynolds number, particle diameter, gas temperature, gas pressure, and molecular mean free path. At sufficiently low pressures, the ratio of the molecular mean free path to the particle diameter (the particle Knudsen number) becomes large enough to significantly reduce the drag coefficient and the particle path can deviate from that of the gas streamlines. A characteristic time scale for particle dynamics is the particle velocity time scale:

$$\tau = \rho_p D p^2 \left[ \frac{1 + 2\frac{\lambda(T,P)}{D_p}\left[1.22 + 0.41 \exp\left(-1.74\frac{D_p}{\lambda(T,P)}\right)\right]}{18\mu} \right] \quad (2)$$

where $\rho_p$ and $\mu$ are respectively the particle density and gas dynamic viscosity.

This time scale together with a characteristic time scale for the gas dynamics, which is a complex function of the gas operating conditions and the separator geometry, affect the capture efficiency of the separator.

Figure 4:
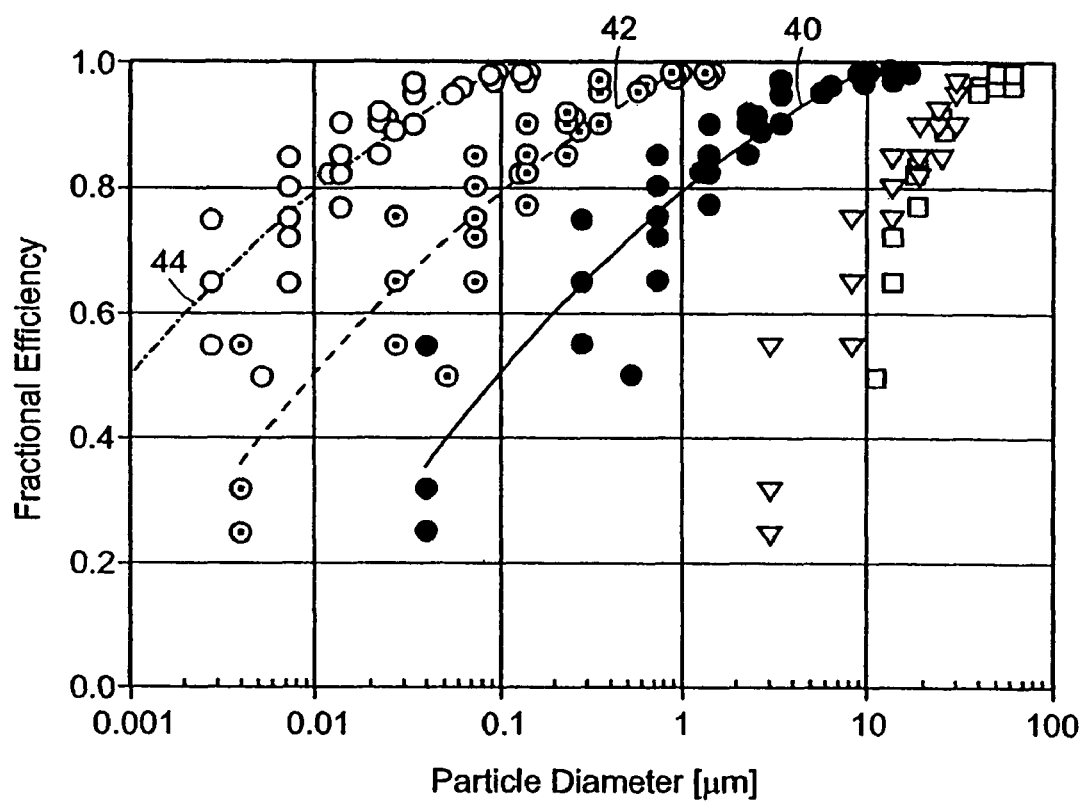
FIG. 4 is a graph based on a semi-empirical model that predicts improved fractional efficiency for the collection of ultra-fine particles at sub-atmospheric pressure with an impact separator. Specifically, the collection efficiency data shown by the symbols .gradient. and ∇ and □ of FIG. 3 at atmospheric pressure is extrapolated to sub-atmospheric pressure equal to $10^{-3}$ (_____), $10^{-4}$ (_ _ _ _ _ _), and $10^{-5}$ (._._._._._.) atm.
Figure 5:
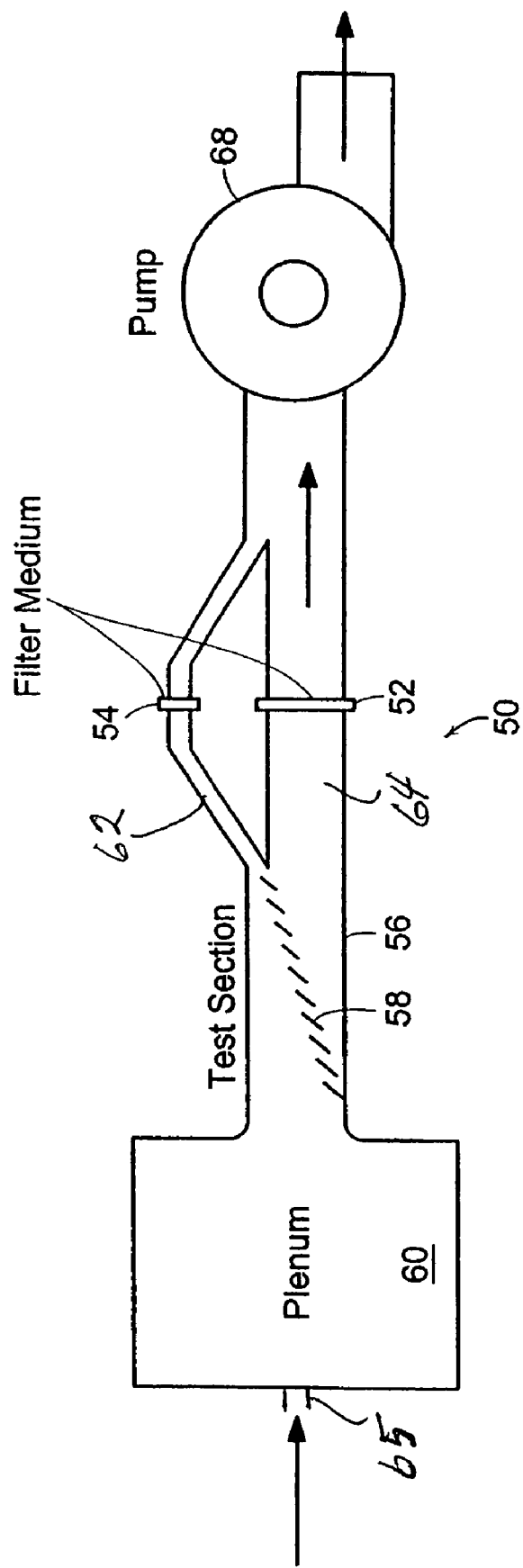
FIG. 5 is a schematic of an impact separation system.

For example, if the time scale of the gas dynamic is known, equivalence of $\tau$ (the characteristic time scale for particle dynamics) assures dynamic equivalence of the particle motion. The equivalence yields a relationship for $D_p$ as a function of P (pressure), T (temperature) and $\rho_p$ (particle density). This permits the extrapolation of the fractional efficiency data in FIG. 3 to sub-atmospheric pressures. As indicated above, FIG. 3 shows a nominal cut diameter (50% fractional efficiency) equal to approximately 6 μm at atmospheric pressures. For the same time scale of the gas dynamics, the equivalence of the time scale $\tau$ in Eq. (2) predicts the fractional efficiency for collection of particles at subatmospheric pressures equal to $10^{-3}$ (_____), $10^{-4}$ (_ _ _ _ _ _), and $10^{-5}$ (._._._._._.) atm shown in FIG. 4 as reference numerals 40, 42, and 44 respectively. Thus the collection efficiency for 1 μm diameter particles increases to approximately 80% and the cut diameter decreases to the order of 0.1 μm at 0.001 atm. This means that the impact separator becomes much more effective in collecting small particles at this sub-atmospheric pressure and additional improvements are evident at still lower pressures. Also, for a range of subatmospheric pressure Eq. (2), together with the data in FIG. 3 predicts the cut diameters, shown in the Table 1. The theory shows that a cut diameter of 15.8 nm can be obtained at 0.0001 atm. This pressure 76 millitorr (76 μm Hg) is easily achieved with a mechanical vacuum pump as shown in FIG. 5.

Predicted Cut Diameters at Sub-Atmospheric Pressures Using the Fractional Efficiency Data in FIG. 3 and Equivalence of Particle Time Scale $\tau$[s]

| Comments | Pressure [atm] | Cut Diameter [μm] |
|---|---|---|
| Data from FIG. 3 | 1 | 6 |
| Equivalence of Particle Time Scale $\tau$ | 0.1 | 5.256 |
|  | 0.01 | 1.557 |
|  | 0.001 | 0.1538 |
|  | 0.0001 | 0.0158 |

For an example, if the gas dynamics need to be ascertained that can be accomplished using Computational Fluid Dynamics (CFD) or a theory disclosed in "Two-dimensional Irrotational Gas Flow With Particles Past a Lamina Array, application to louvered impact separators," by T. R. Blake and K. Jakus in World Congress Particle Technology 4 Sydney in 2002, and which is incorporated in its entirety by reference, shows that for the flat plate array of FIG. 1 the trajectories of 1 μm diameter particles with a density of 1000 kg/m³ at 0.005 atm are equivalent to 7 μm particles with the same density at 1 atm. That theory shows that the large angle of attack (angle between the face of the flat plate and the direction of the incoming gas flow) for example, above 30 degrees relative to the direction of flow in FIG. 1 enables classification and collection of particles with a density of 1000 kg/m³ at these low pressures but that a smaller angle of attack is needed for higher density particles. CFD modeling shows the same trend. These conclusions are consistent with the data in FIGS. 2 and 3 where the collection efficiency for the glass particles (FIG. 2) with a density of 2500 kg/m³ are consistent with those of dust (FIG. 3) with a density of 1000 kg/m³. That is achieved in part because the angle of attack is smaller in FIG. 2 than in FIG. 3. This combination of theory and experiment offers a semi-empirical model for selecting operating pressure, geometry, location, and angle of attack of the deflecting surfaces.

Again with reference to FIG. 4, at 1 atm, approximately 50% of the 6 μm particles are collected. Lowering the pressure to 0.1 atm does not significantly change the collection efficiency. However, at a pressure of 0.0001 atm, 80% of the 100 nm particles are captured. This pressure 76 millitorr (76 μm of mercury) is easily achievable with a mechanical vacuum pump.

As shown in FIG. 5, an embodiment of an impact separation system 50 uses filters 52 and 54 for collecting different particle sizes. The gas and particles flow along the longitudinal direction of the walls 56 from left to right, where the conduit is comprised of a blade-array 58 and a wall in a rectangular channel. Upstream of the conduit of this system the particles are introduced into a plenum chamber 60 through a sonic nozzle 65 designed to assure uniform powder loading. The blades deflect the approaching powder into two streams, namely the "collected" and the "classified" streams in the second channel 62 and the first channel 64, respectively. For this system the conduit has an outlet port for removal of the collected particles. A second outlet port provides for the gas and classified particles, which escape from the conduit past the array of blades 58. The outlet ports are connected to a mechanical vacuum pump 68. It has sufficient pumping speed to provide transport velocities past the blade-array up to 30 m/s.

In the embodiment shown, commercially available filter media can be used to collect the powders in these two streams. In other embodiments the two streams can be connected to separate vacuum pumps and directed to another process or to collection/packaging units.

Figure 6:
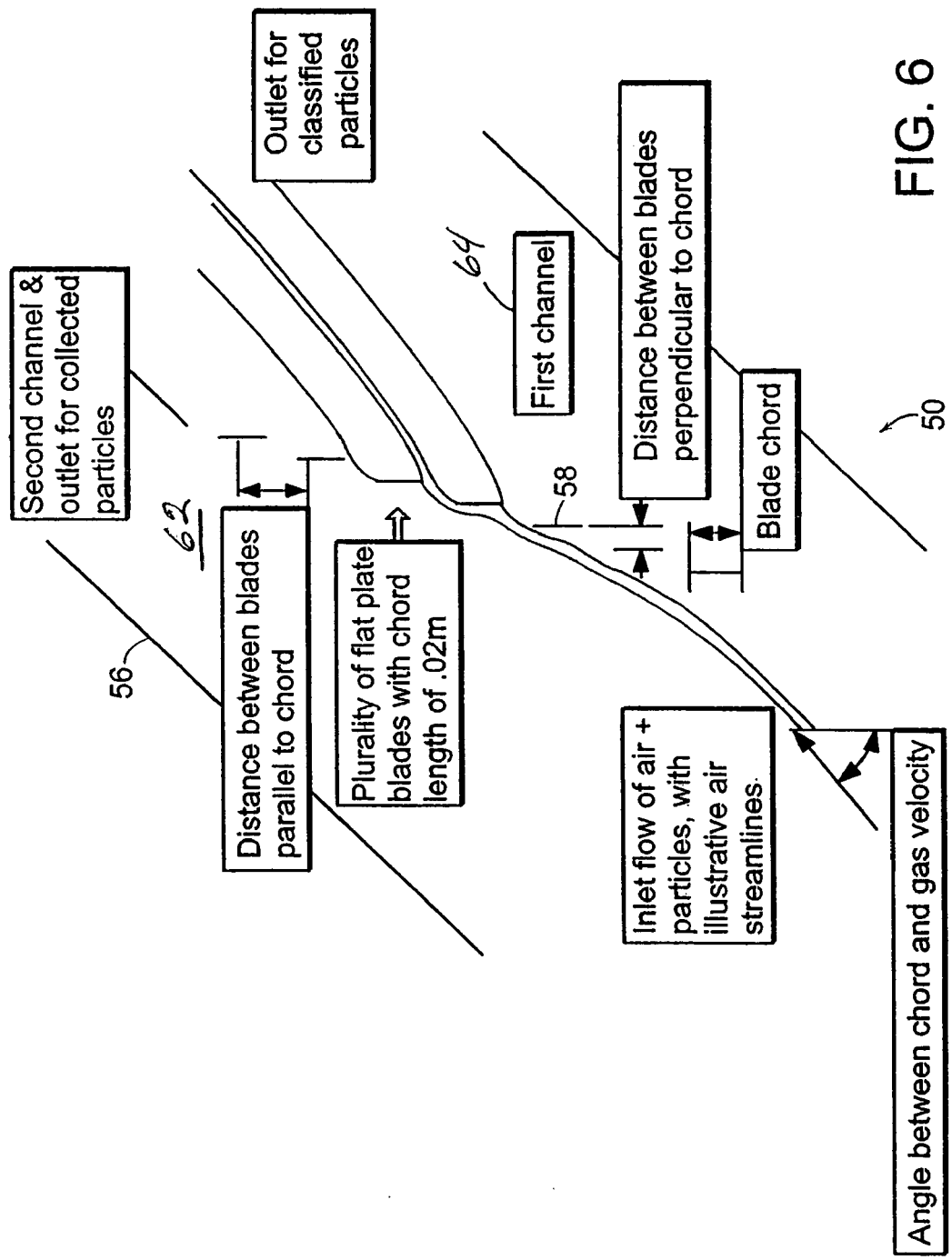
FIG. 6 is a side view of a rectangular conduit of an impact separator having a plurality of flat plate blades.

An embodiment of a conduit comprised of a wall and an array of 7 flat plate blades in a rectangular channel is shown in FIG. 6. The semi-empirical model defines the number and angle of the blades in the blade-array. The gas and particles approach the blades at 20 m/s and an angle of attack of 45 degrees relative to the front face of the blades. Each blade has a chord length of 0.02 m with the blade centers displaced 0.035 m and 0.01 m respectively in directions parallel and perpendicular to the face of the blade. The semi-empirical model predicts well-organized flow around the array where aerodynamic wakes do not interfere with downstream blades and predicts a cut diameter of 0.1538 μm at 0.001 atm pressure.

Figure 7:
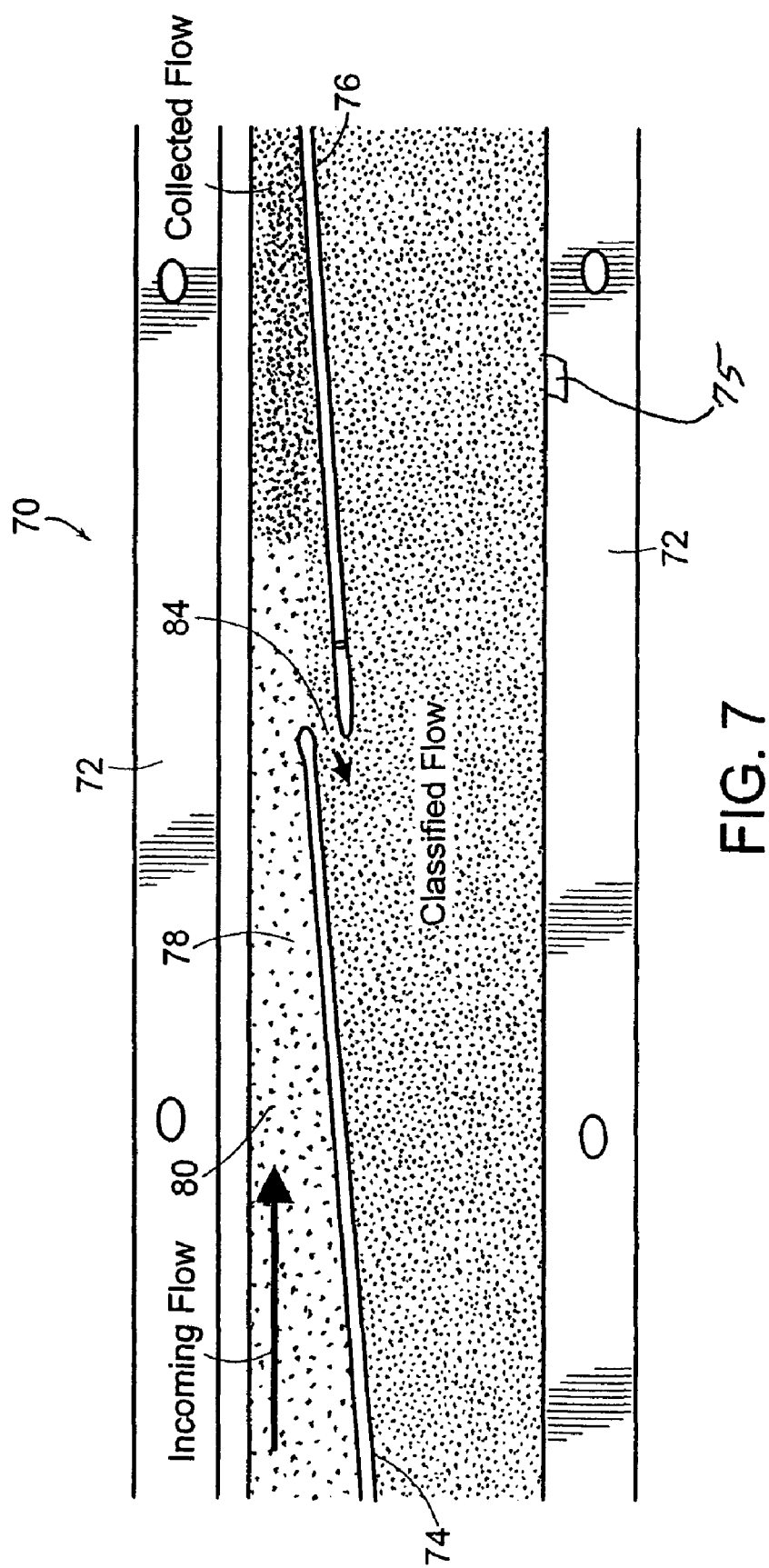
FIG. 7 is a side view of an actual model rectangular conduit of an impact separator having 2 blades and showing post-test residue of glass powder.

Experimentation validated that ultra-fine particles can be classified with high efficiency using inertial separation at sub-atmospheric pressures using the semi-empirical model of Eq. (2) and data such as in FIG. 3. This embodiment, including a conduit 70 comprised of a wall 72 and a pair of flat plate blades 74 and 76 as shown in FIG. 7. The flow is from left to right in FIG. 7. The gas and particles approach the blades 74 and 76 at between 10 and 30 m/s and preferably at 15 m/s and an angle of attack of 7 degrees relative to the front face 78 of the blades 74 and 76. Most of the air and particles are retained within the channel 80 between the blades 74 and 76 and upper wall 72; that air carries the "collected" particles. A semi-empirical model using data and CFD modeling permits selection of the operating pressure, geometry, location, and angle of attack of the deflecting surface in FIG. 7. In a preferred embodiment, the blades can be adjusted by an actuation or motor to reset the angle of attack and the gap spacing between the blades. The blades can be motorized and connected to a controller that can also be used to control chamber pressure with the pump and/or the speed with which particles are introduced into the plenum. Approximately 20% of the inlet air, together with the "classified" particles will escape through the gap 84 between the blades 74 and 76. The particles used in these tests are a solid spherical glass powder with an average diameter. of 0.7 µm (Potters Industries, PA, Type 10002E, density of 2500 kg/m); a SEM image of the incoming particles is shown in FIG. 8A.

A sampling probe 75, seen in FIG. 7, is placed below the blade 76 downstream of the gap 84 between the blades in order to measure or assess the particle size distribution of the "classified" particle steam. The SEM images and histogram for the incoming and classified particles in respectively FIGS. 8A and 8B, and FIG. 8C show that only the smaller size particles pass through the gap at 1 Torr ($1.3 \times 10$ atm).

Figure 9:
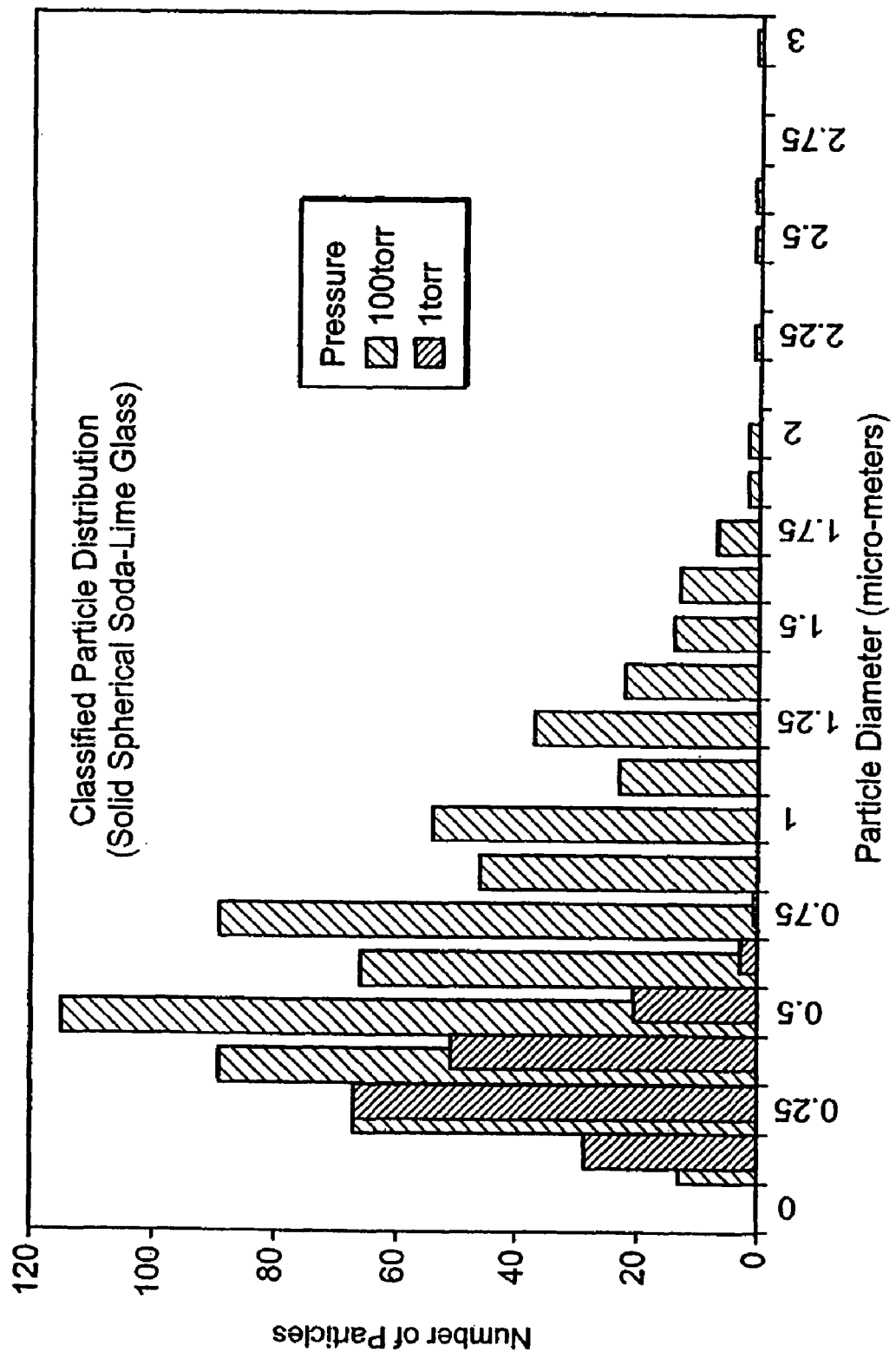
FIG. 9 shows histograms of particle size distribution for classified glass powders sampled at 100 Torr (0.13 atm) and 1 Torr ($1.3\times10^{-3}$ atm) operating pressures in the 2-blade impact separator in FIG. 7.

In FIG. 9 the histogram for the classified particle stream at 1 Torr ($1.3 \times 10^{-3}$ atm) is compared with that at 100 Torr (0.13 atm), where the latter has essentially the same particle size distribution as that of the incoming flow. The figure shows that reducing the operating pressure reduces the size distribution of the classified particle stream. Conversely the lower pressure permits the collection of smaller particles.

Figure 8A:
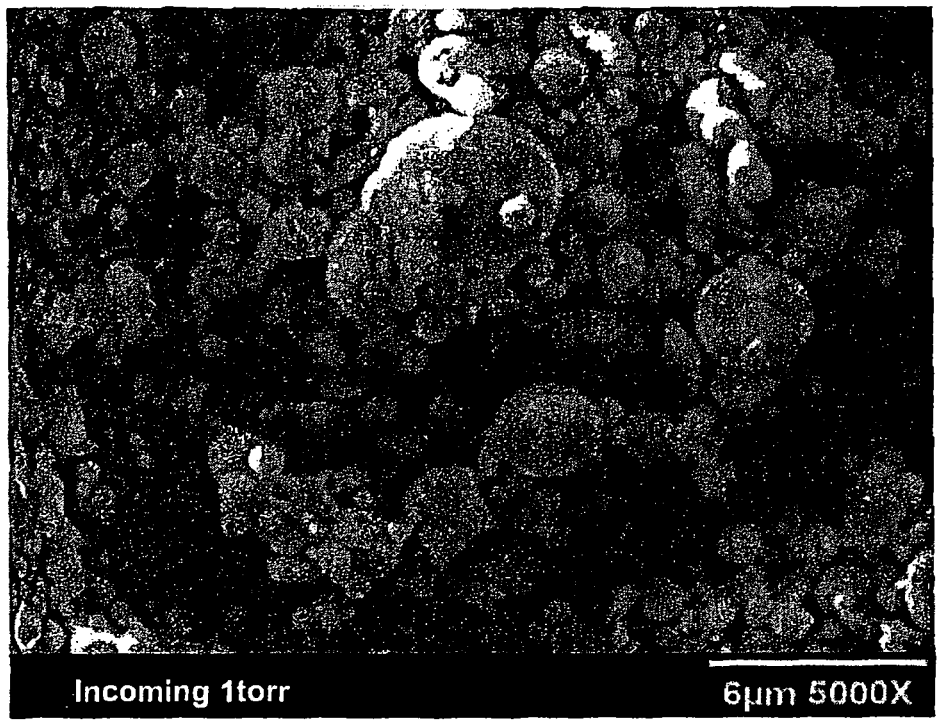
FIG. 8A shows SEM (scanning electron microscope) image of incoming glass powder sampled at 1 Torr ($1.3\times10^{-3}$ atm) operating pressure in the 2-blade impact separator in FIG. 7.
Figure 8B:
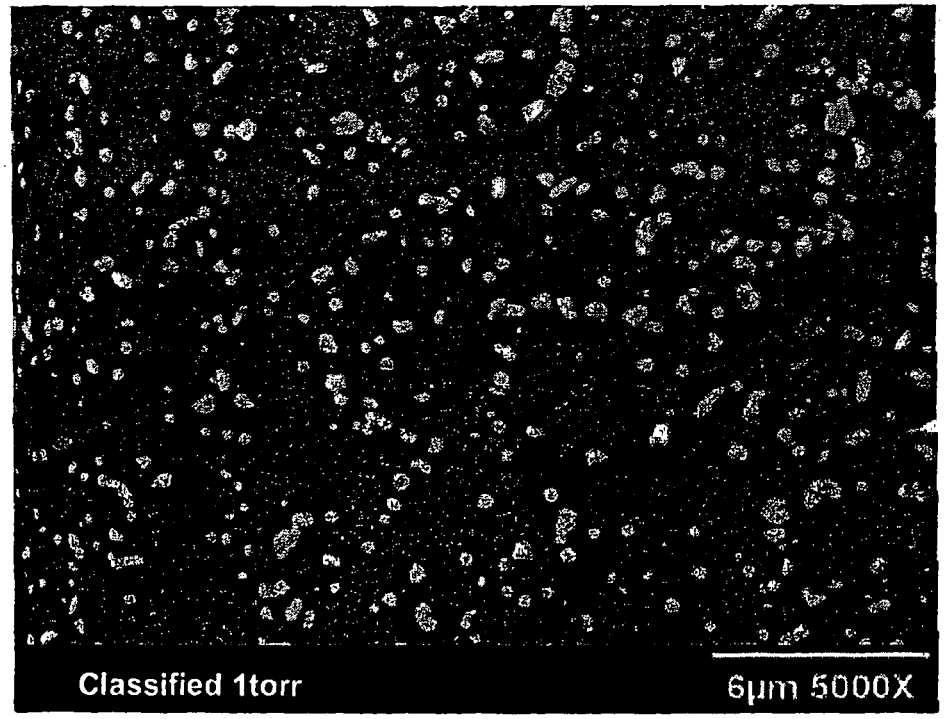
FIG. 8B shows SEM (scanning electron microscope) image of classified glass powder sampled at 1 Torr ($1.3\times10^{-3}$ atm) operating pressure in the 2-blade impact separator in FIG. 7.
Figure 8C:
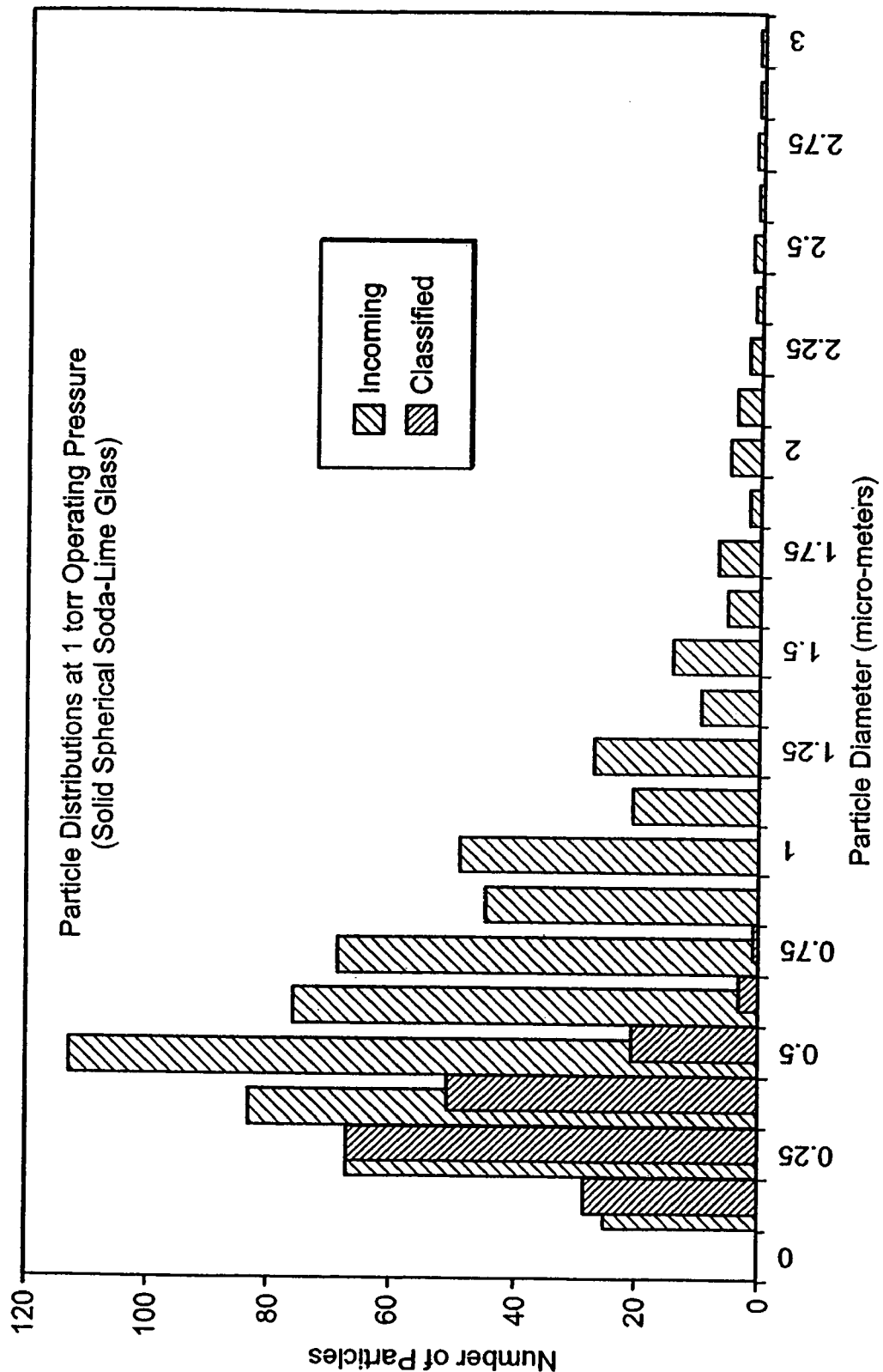
FIG. 8C shows histograms of particle size distribution for incoming and classified glass powders sampled at 1 Torr ($1.3\times10^{-3}$ atm) operating pressure in the 2-blade impact separator in FIG. 7.

To someone skilled in the art it is apparent that the collection and classification of particles illustrated in FIGS. 8A through 9 and obtained with the two blade impact separator in FIG. 7 would be observed in an embodiment where the conduit in FIG. 7 is comprised of an upper wall and a plurality of blades. A plurality of blades allows for most of the incoming gas to escape through the gaps between the blades and enables a concentrated collection of the ultra-fine powder. The selection of the geometry and the operating conditions through a semi-empirical model permits collection of ultra-fine powders larger than a narrow particle size range and the classification of the powder below that size range.

Pharmaceutical particle size, density and shape will affect the particle dynamics and the impact with aerodynamic surfaces. For example, supercritical fluid technologies yield micron and sub-micron size particles of active drug substances, such as nicotinic acid, salmeterol xinafoate, acetaminophen, and crystallized proteins. Microphotographs of these particles exhibit non-spherical and irregular shapes. The effective grain densities are dependent upon the particle morphology, but are expected to be in the range 1000-1500 kg/m$^3$. Other technologies yield larger particle sizes and more irregular shapes for both active drug substances (silvers and flakes) and expients, such as lactose α-monohydrate. Particle shape can have a strong influence on particle dynamics, both relative to the motion of the gas and to collision with and reflection from a solid surface. For particles that are near spherical, it is convenient to use a "shape factor" to estimate the drag force on a particle and relate it to an equivalent sphere. For those particles and others such as oblate spheroids and cylinders, and silver- and flake-like shapes, the collection and classification can be affected through specification of operating conditions and geometry of the impact separator. The invention described herein enables the collection and classification of powders including pharmaceutical powders, in the size range below 1 μm diameter with irregular shape.

The claims should not be read as limited to the described order or elements unless stated to that effect. Therefore, all embodiments that come within the scope and spirit of the following claims and equivalents thereto are claimed as the invention.

What is claimed is:

1. An impact separator for classifying particles comprising:

a housing having a plurality of channels through which a fluid with particles flows; and a deflecting surface in the housing that alters motion of the particles and the fluid with respect to each other to separate particles of different sizes that are under 1 micron in diameter, the particles separating along separate channels each having a filter and being coupled to a pump, the pump maintaining a fluid pressure in the channels of less than $10^{-1}$ atmospheres such that particles are transported through the channels at velocities in a range of 10 m/s to 30 m/s.

2. The impact separator of claim 1 wherein the separator has a fractional efficiency of more than 50% for the separation and collection of particles, the particles with a size larger than a predetermined diameter being diverted to a second channel and collected.

3. The impact separator of claim 1 wherein the separator has a fractional efficiency or more than 80% for the separation and classification of particles, the particles with a size smaller than a predetermined diameter are directed with the fluid in a first channel and are separated and classified.

4. The impact separator of claim 1 further comprising a plenum chamber with a sonic nozzle, the chamber being connected to the channels such that particles are delivered to the deflecting channel.

5. The impact separator of claim 1 further comprising a powder synthesis chamber with a nozzle connected to the channel that provides uniform particle loading into the housing.

6. The impact separator of claim 1 wherein the pump is a vacuum pump.

7. The impact separator of claim 6 wherein the vacuum pump provides a transport velocity past the deflecting surface of at least 30 meters per second.

8. The impact separator of claim 1 further comprising at least one filter for collecting particles downstream of the deflecting surface.

9. The impact separator of claim 1 wherein the deflecting surface is planar.

10. The impact separator of claim 1 wherein the deflecting surface comprises a plurality of blades each having an aerodynamic cross-section.

11. The impact separator of claim 1 wherein for particles, with particle inertia small relative to drag, the particles follow the gas in a first channel; and those particles having a particle inertia that is large relative to drag diverted to a second channel.

12. The impact separator of claim 1 wherein the particles can be collected or classified from agglomerates using impact separation.

13. The impact separator of claim 1 wherein the deflecting surface has a cylindrical surface.

14. The impact separator of claim 1 wherein the deflecting surface comprises a plurality of rectangular blades.

15. The impact separator of claim 1 wherein the deflecting surface comprises a plurality of blades, each pair of adjacent blades having a spacing between the blades such that particles having a size in a selected range are directed through the spacing into one of the separate channels.

16. The impact separator of claim 1 further comprising an actuator to adjust a position of the deflecting surface.

17. The impact separator of claim 1 wherein the separator separates particles for a medication.

18. The impact separator of claim 1 further comprising a probe that measures particle size in the chamber.

19. The impact separator of claim 1 wherein particles having a diameter of less than 1 micron are separated with a fractional efficiency of at least 50% by the deflecting surface.

20. The impact separator of claim 1 further comprising a plurality of blades wherein the blades are separated by a first distance parallel to a face of the blades and separated by a second distance that is perpendicular to the face of the blades.

21. The impact separator of claim 1 wherein the deflecting surface has an angle of attack of at least 30 degrees.

22. The impact separator of claim 1 wherein the deflecting surface comprises a plurality of blades having an angle of attack of least 45 degrees.

23. The impact separator of claim 1 wherein the channels have a pressure of $10^{-3}$ atmospheres or less.

24. An impact separator for classifying particles comprising:

- a housing having a channel through which a fluid with particles flows;
- a powder synthesis chamber and a nozzle to load particles from the chamber into the channel;
- a deflecting surface in the channel that alters motion of the particles and the fluid with respect to each other to separate particles of different sizes that are under 1 micron in diameter; and
- a flow mechanism that reduces fluid pressure in the channel to less than one atmosphere.

25. The impact separator of claim 24 wherein the separator has a fractional efficiency of more than 50% for the separation and collection of particles, the particles with a size larger than a predetermined diameter being diverted to a second channel and collected.

26. The impact separator of claim 24 wherein the separator has a fractional efficiency or more than 80% for the separation and classification of particles, the particles with a size smaller than a predetermined diameter are directed with the fluid in a first channel and are separated and classified.

27. The impact separator of claim 24 wherein the flow mechanism is a vacuum pump.

28. The impact separator of claim 27 wherein the vacuum pump provides a transport velocity past the deflecting surface of at least 30 meters per second.

29. The impact separator of claim 24 wherein the particles can be collected or classified from agglomerates using impact separation, the channel having a pressure of $10^{-1}$ atmospheres or less.

30. An impact separator for classifying particles comprising:

- a particle separator having a plurality of separate channels through which a fluid with particles flows, each channel having a filter;
- a deflecting surface in the channel that alters motion of the particles and the fluid with respect to each other to separate particles of different sizes that are under 1 micron in diameter; and
- a flow mechanism that reduces fluid pressure in the channel to less than one atmosphere.

31. The impact separator of claim 30 wherein the separator has a fractional efficiency of more than 50% for the separation and collection of particles, the particles with a size larger than a predetermined diameter being diverted to a second channel and collected.

32. The impact separator of claim 30 wherein the separator has a fractional efficiency or more than 80% for the separation and classification of particles, the particles with a size smaller than a predetermined diameter are directed with the fluid in a first channel and are separated and classified.

33. The impact separator of claim 30 wherein the vacuum pump provides a transport velocity past the deflecting surface of at least 30 meters per second.

34. The impact separator of claim 30 wherein the particles can be collected or classified from agglomerates using impact separation, the channel having a pressure of $10^{-1}$ atmospheres or less.

35. The impact separator of claim 30 wherein the separator separates particles for a medication.

36. An impact separator for manufacturing medication comprising:

- a housing having a channel through which a fluid with medication particles flows;
- a nozzle that couples a particle source to the housing, the particle source having medication particles with a distribution of particle sizes under 1 micron in diameter;
- a deflecting surface in the channel that alters motion of the medication particles and the fluid with respect to each other to separate medication particles of different sizes that are under 1 micron in diameter; and
- a flow mechanism adopted to provide a fluid pressure in the channel of less than $10^{-1}$ atmosphere and a particle velocity of 10 m/s up to 30 m/s.

37. The impact separator of claim 36 wherein the pressure in the chamber is in the range of $10^{-1}$ to $10^{-5}$ atmospheres.

38. The impact separator of claim 36 wherein the nozzle comprises a sonic nozzle.

39. The impact separator of claim 36 further comprising a probe that measures a particle stream in the channel.

40. An impact separator for classifying particles comprising:

- a housing having a channel through which a fluid with particles flows;
- a nozzle that delivers the fluid into the housing;
- a deflecting surface in the channel that alters motion of the particles and the fluid with respect to each other to separate particles of different sizes that are under 1 micron in diameter; and
- a vacuum pump coupled to the channel that maintains a fluid pressure in the channel of less than $10^{-1}$ atmosphere such that particles are transported through the channel.

41. The impact separator of claim 40 wherein the separator has a fractional efficiency of more than 50% for the separation and collection of particles, the particles with a size larger than a predetermined diameter being diverted to a second channel and collected.

42. The impact separator of claim 40 wherein the separator has a fractional efficiency or more than 80% for the separation and classification of particles, the particles with a size smaller than a predetermined diameter are directed with the fluid in a first channel and are separated and classified.

43. The impact separator of claim 40 wherein the nozzle comprises a sonic nozzle that couples the fluid to a plenum chamber, the chamber being connected to the channel such that particles are delivered into the channel.

44. The impact separator of claim 40 wherein the vacuum pump provides a transport velocity past the deflecting surface of between 10 meters per second and 30 meters per second.

45. The impact separator of claim 40 wherein the deflecting surface comprises a plurality of blades each having an aerodynamic cross-section.

46. The impact separator of claim 40 further comprising a probe that measures a particle stream in the chamber.

47. The impact separator of claim 40 wherein the particles separate along separate channels that are each coupled to a separate pump.

48. The impact separator of claim 40 wherein the deflecting surface has an angle of attack of at least 30 degrees.

49. The impact separator of claim 40 wherein the deflecting surface comprises a plurality of blades having an angle of attack of least 45 degrees.

50. The impact separation of claim 40 wherein the pump provides a fluid pressure in the channel of $10^{-3}$ atm or less.

51. The impact separation of claim 40 further comprising a plurality of deflecting surfaces that are displayed at different distances along an axis of the channel.

* * * * *